United States Patent
Zhong et al.

(10) Patent No.: US 9,875,084 B2
(45) Date of Patent: Jan. 23, 2018

(54) CALCULATING TRIGONOMETRIC FUNCTIONS USING A FOUR INPUT DOT PRODUCT CIRCUIT

(71) Applicant: Vivante Corporation, Santa Clara, CA (US)

(72) Inventors: Lefan Zhong, San Jose, CA (US); Guosong Li, Shanghai (CN); Zhenyu Wang, San Jose, CA (US); Rui Zhao, Sichuan Province (CN)

(73) Assignee: Vivante Corporation, San Jose, CA (US)

( * ) Notice: Subject to any disclaimer, the term of this patent is extended or adjusted under 35 U.S.C. 154(b) by 34 days.

(21) Appl. No.: 15/141,625

(22) Filed: Apr. 28, 2016

(65) Prior Publication Data

US 2017/0315780 A1 Nov. 2, 2017

(51) Int. Cl.
*G06F 7/548* (2006.01)
(52) U.S. Cl.
CPC .................... *G06F 7/548* (2013.01)
(58) Field of Classification Search
None
See application file for complete search history.

(56) References Cited

U.S. PATENT DOCUMENTS

| | | | |
|---|---|---|---|
| 3,688,098 A | 8/1972 | Thomas | |
| 4,777,613 A | 10/1988 | Shahan | |
| 4,827,442 A | 5/1989 | Mehrgardt | |
| 4,870,608 A | 9/1989 | Kametani | |
| 4,956,799 A | 9/1990 | Nakayama | |
| 5,452,241 A | 9/1995 | Desrosiers | |
| 5,774,082 A | 6/1998 | Chu | |
| 5,963,460 A | 10/1999 | Rarick | |
| RE36,388 E | 11/1999 | Fox | |
| 6,021,423 A * | 2/2000 | Nag | G06F 17/142 708/403 |
| 6,055,553 A | 4/2000 | Kantabutra | |
| 6,141,670 A | 10/2000 | Story | |
| 6,327,605 B2 | 12/2001 | Arakawa | |
| 6,640,237 B1 | 10/2003 | Genrich | |
| 7,031,992 B2 | 4/2006 | Khan | |
| 8,090,756 B2 | 1/2012 | Tubbs | |
| 8,166,091 B2 * | 4/2012 | Swartzlander, Jr. | G06F 7/483 708/501 |

(Continued)

FOREIGN PATENT DOCUMENTS

CN 103150137 A 6/2013
WO WO1986006517 A1 11/1986

*Primary Examiner* — Michael D Yaary
(74) *Attorney, Agent, or Firm* — David R. Stevens; Stevens Law Group

(57) ABSTRACT

A circuit is disclosed that uses a four element dot product circuit (DP4) to approximate an argument t=x/pi for an input x. The argument is then input to a trigonometric function such as Sin Pi( ) or Cos Pi( ). The DP4 circuit calculates x times a representation of the reciprocal of pi. The bits of the reciprocal of pi that are used are selected based on the magnitude of the exponent of x. The DP4 circuit includes four multipliers, two intermediate adders, and a final adder. The outputs of the multipliers, intermediate adders, and final adder are adjusted such that the output of the final adder is a value of the argument t that will provide an accurate output when input to the trigonometric function.

20 Claims, 7 Drawing Sheets

(56) References Cited

U.S. PATENT DOCUMENTS

| | | |
|---|---|---|
| 8,589,463 B2 | 11/2013 | Langhammer |
| 8,626,813 B1 * | 1/2014 | Swartzlander ........ G06F 7/5443 |
| | | 708/501 |
| 2002/0107900 A1 * | 8/2002 | Enenkel ................ G06F 7/483 |
| | | 708/501 |
| 2004/0034676 A1 * | 2/2004 | Reshef ................ G06F 17/145 |
| | | 708/400 |
| 2005/0203980 A1 | 9/2005 | Harrison |
| 2009/0300088 A1 | 12/2009 | Michaels |
| 2013/0060829 A1 | 3/2013 | Spencer |

* cited by examiner

US 9,875,084 B2

CALCULATING TRIGONOMETRIC FUNCTIONS USING A FOUR INPUT DOT PRODUCT CIRCUIT

BACKGROUND

Field of the Invention

This invention relates to systems and methods for performing calculating trigonometric functions using electronic circuits.

Background of the Invention

In conventional computer systems, trigonometric functions are either implemented as (a) a series of computer instructions that calculate the trigonometric function using primitive mathematical operations (add, subtract, multiple, divide, etc.), (b) a look up table that is used to interpolate outputs of a trigonometric function for a particular input argument or set of arguments, (c) a dedicated circuit that is programmed specifically to computer the trigonometric function. All of these approaches have disadvantages, (a) is very slow inasmuch as trigonometric functions are complex, (b) either has slow precision where the look up table is small or has high precision requiring a very large look up table, (c) requires a large area on a silicon chip, which may not be available within size constraints.

A common approach to calculating a trigonometric function is to define the trigonometric circuit such that it computes the function with as $sinPi(t)=sin(\pi*t)$, $cosPi(t)=cos(\pi*t)$, $tanPi(t)=tan(\pi*t)$, etc., where x is the input argument. Since the input argument is often expressed in radians, rather than as multiple of $\pi$, an input argument to such a function must be calculated as $t=x/\pi$, where x is the input argument in radians. Accordingly, calculating the input argument requires additional processing which either takes up processing time or requires space on a chip.

The systems and methods disclosed herein provide an improved approach for calculating an input argument $t=x/\pi$.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
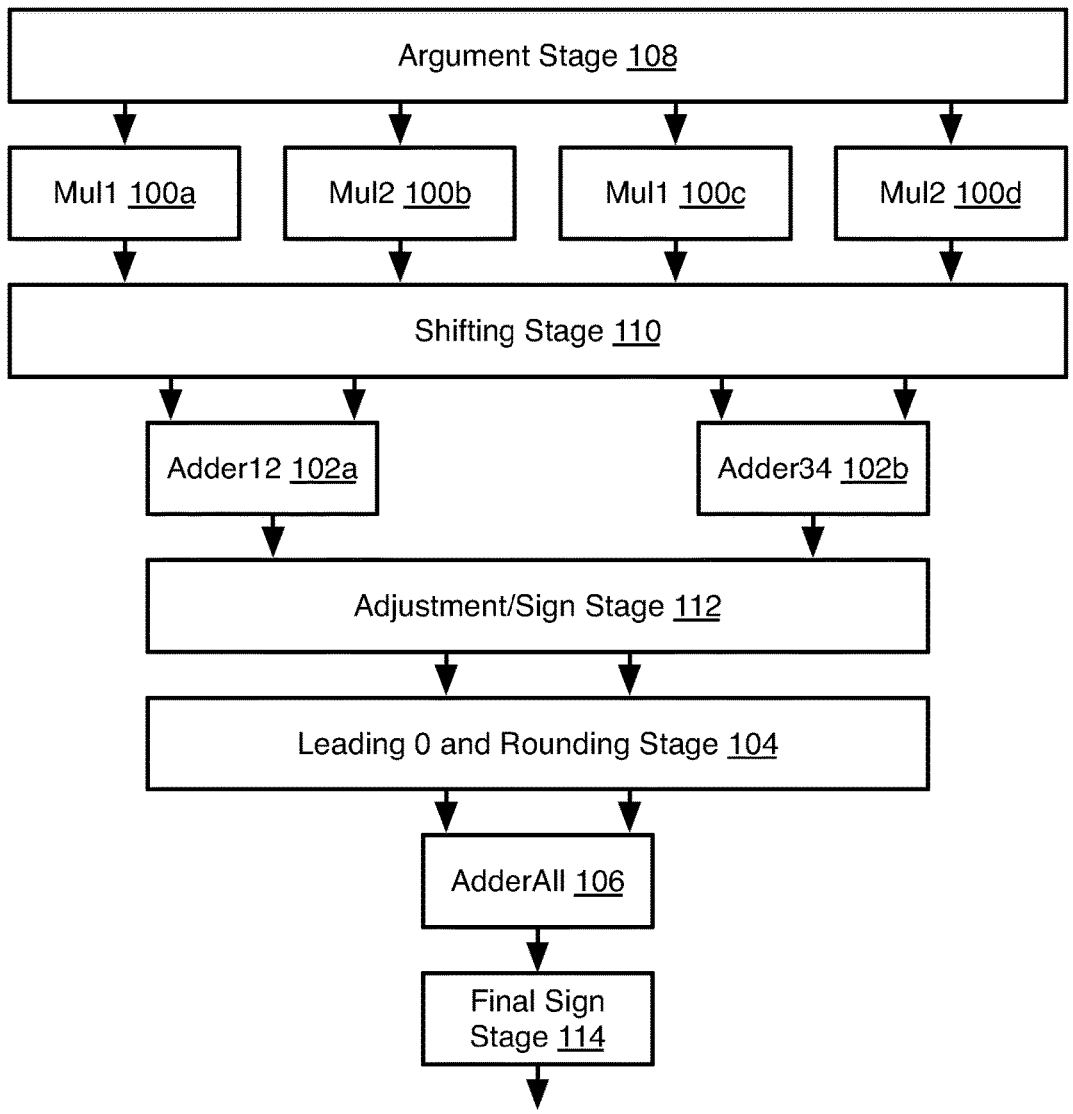
FIG. 1 is a schematic block diagram of a components for computing trigonometric functions in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized, including non-transitory media. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, many modern computing systems include a general purpose processor or graphics processing unit (GPU) that implements a dedicated circuit for computing a dot product. For example, a four input dot product (Dp4) is a commonly implemented circuit. A Dp4 circuit receives four first inputs (u1, u2, u3, u4) and four second inputs (v1, v2, v3, v4). These inputs are then input into multipliers 100a-100d that produce outputs Mul1, Mul2, Mul3, and Mul4, respectively. For example, u1 and v1 are input to multiplier 100a, inputs u2 and v2 are input to multiplier 100b, inputs u3 and v3 are input to multiplier 100c, and inputs u4 and v4 are input to multiplier 100d. Each multiplier 100a-100d outputs a product if its two input arguments. The outputs of two of the multipliers 100a, 100b are input to a first adder 102a, which produces an output Adder12_0, and the outputs of the other two multipliers 100c, 100d are input to a second adder 102b, that produces an output Adder34_0. The outputs of the adders 102a, 102b may be further processed by a leading 0 and rounding stage 104 that identifies the leading zero, determining an exponent for the output of the adders 102a, 102b and rounding the outputs of the adders 102a, 102b to an appropriate mantissa size.

The outputs of the leading 0 and rounding stage 104 are then input to a final adder stage 106. The output of the final adder stage 106 ("AdderAll") is the dot product of the first and second input arguments.

As is apparent in FIG. 1, other components may be added to the conventional Dp4 according to the embodiments disclosed herein in order to use the Dp4 circuits 100a-100d, 102a-102b, 104, and 106 to compute the input argument t=x/π. In particular, a representation of 1/π may be input to the multipliers 100a-100d as the first arguments and the input argument x may be input to the multipliers 100a-100d as the second arguments. In particular, different segments of the bits of a representation of 1/π may be input as the arguments u1 to u4 and the second input arguments are set to v1=v2=v3=v4=x.

An argument stage 108 computes the portions of the representation of 1/π that are input as u1 to u4. The operation of the argument stage 108 may implement some or all of the steps shown in FIG. 2A.

A shifting stage 110 adjusts the outputs of the multipliers 100a-100d, such as by performing some or all of the steps shown in FIGS. 2B through 2E. The outputs of the adders 102a, 102b may also be adjusted by ad adjustment and sign stage 112, such as by performing some of the steps shown in FIG. 2E. The sign of the output of the adder 106 may be adjusted by a final sign stage 114, such as by implementing the method of FIG. 2F.

The result of the operation of the stages 108, 110, 112, 114 is to compute the input argument t according to (1).

$$t = \begin{cases} \left(\frac{|x|}{\pi} - (\text{int})\left(\frac{|x|}{\pi}\right)\right) * (-1)^{(\text{int})\left(\frac{|x|}{\pi}\right)} * \text{Sign}(x), & |x| > 2^{-24}, \; frac\left(\frac{|x|}{\pi}\right) < 0.5 \\ \left((\text{int})\left(\frac{|x|}{\pi}\right) + 1 - \frac{|x|}{\pi}\right) * (-1)^{(\text{int})\left(\frac{|x|}{\pi}\right)} * \text{Sign}(x), & frac\left(\frac{|x|}{\pi}\right) \geq 0.5 \\ x * 2^{128} & |x| \leq 2^{-24} \end{cases} \quad (1)$$

In particular, the operation of the stages 108, 110, 112, 114 is to approximate (1) within the limitations of floating point precision. For purposes of this application, "approximate" an equation shall mean approximating an output of the equation within 10 ULP (unit in last place) of the floating point format used to represent the output of the equation. Likewise, any computation shown herein as a mathematical function may be understood to disclose the floating point operation approximating that mathematical function to within 10 ULP of the floating point representation of the output of the mathematical function.

The motivation for (1) is to avoid errors that result from the limited number of bits available to represent intermediate values when calculating t=x/π. Numbers may be represented as floating point values V including three parts: exponent (expV), mantissa (mantissaV), and sign (signV). In some representations any floating point Value V, may be approximated using these three parts according to (2), where #BitsMantissaV is the number of bits used to represent the mantissa.

$$V = (\text{sign}V! = 1?1:-1) * 2^{expV} * (\text{mantissa}V/2)^{\#BitsMantissaV-1} \quad (2)$$

Sign V is binary and represents whether the value V is negative (1→negative, 0→non-negative). ExpV is an integer that represents the scale of the value V and integer mantissaV is the precision of the datum.

In some implementations of Dp4, the four multipliers 100a-100d each output a 48 bit mantissa. The adders 102a, 102b output 72 bit mantissas (Adder12_0, Adder34_0) then round to 48 bits mantissas. Since there may be bit cancellation in u1*v1+u2*v2, one must find the leading 0 position of Adder12_0, and keep the 48 bit mantissa from the leading 0 position.

The final adder 106 gets two inputs both having a 48 bit mantissa outputs a standard 32 bit floating point value (23 bit mantissa+1 bit hind 1).

Inside floating a multiplier 100a-100c, one separates the floating point values into the exponent and the mantissa. The result of the multiplier 100a-100c can be considered as a new mantissa=mantissaU1*mantissaV1 (48 bits) and new exponent=exponentU1+exponentV1+1.

When calculating trigonometric functions Sin(x), Cos(x) and Tan(x), one may calculate the function as Sin(x)=Sin Pi(x/π), as noted above, since high precision Sin Pi(t) instructions are available. However, there are problems when processing t=x/π. If $|x|<2^{-126}*\pi$, then t is a denormalized number (less than $2^{-126}$). Since some processing devices don't support denormalized numbers, such small values will be interpreted as zero. Therefore, Sin(x)=Sin Pi(t)=0, for $|x|<2^{-126}*\pi$. The relative error is 100% since the correct value is actually very close to x. The other problem is how to keep the precision of t=x/π. When x is very large (over $2^{26}$), the normal floating point calculation of t=x/π can only keep the integer part, which makes Sin(x)=Sin Pi(t)=0. The relative error is also 100%.

There are a lot of ways to calculate Sin(x) correctly. Most famous one is "Payne and Hanek's reduction method" (M. Payne and R. Hanek, "Radian reduction for trigonometric functions," *SIGNUM Newsletter*, 18:19-24, 1983), which is hereby incorporated herein by reference in its entirety. However, to implement this method directly would require a lot of instructions. In the embodiments disclosed herein, a conventional Dp4 circuit is modified to calculate (3) for a real value of x.

$$t = (|x|/\pi - (int)(|x|/\pi + 0.5)) * (-1)^{(int)(\frac{|x|}{\pi}+0.5)} * \text{Sign}(x) \quad (3)$$

Mathematically, Sin(x)=Sin(π*t)=Sin Pi(t), and |t|≤0.5 for this formula. However, if $|x|<2^{-126}*\pi$, the output of (3) is a denormal floating point value in |x|/π. In order to handle this case correctly, t is determined according to (4).

$$t = \begin{cases} \left(\frac{|x|}{\pi} - (int)\left(\frac{|x|}{\pi}+0.5\right)\right) * (-1)^{(int)(\frac{|x|}{\pi}+0.5)} * \text{Sign}(x), & |x| > 2^{-24} \\ x*2^{128} & |x| > 2^{-24} \end{cases} \quad (4)$$

When t is passed to the Sin Pi( )pipeline to calculate Sin Pi(t) for |t|<2.0, and change Sin Pi pipeline a little bit to return to $t/2^{128}$ (adjust the exponent of input) when |t|>=2.0. Mathematically, t is therefore determined according to (1).

Referring to FIGS. 2A through 2F, the illustrated methods illustrate the functions of the stages 108, 110, 112, and 114 that transform the intermediate and final values of a Dp4 circuit in order to output an approximation of t=x/π according to (1) in order to both improve the accuracy of the final calculating and to do so using a commonly available circuit in many computing systems.

Figure 2A:
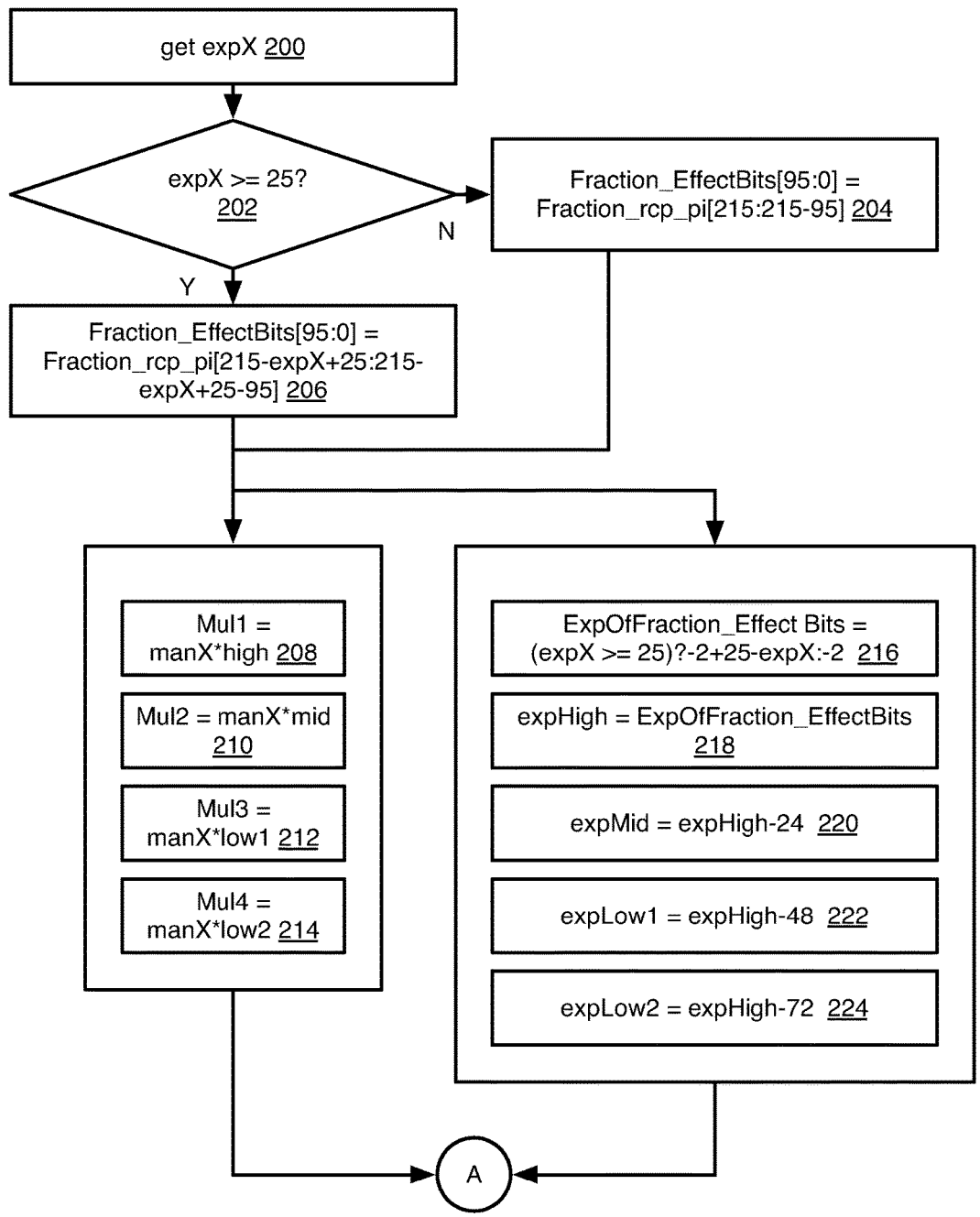
FIGS. 2A to 2F are process flow diagrams of a method for computing $t=x/\pi$ using a four element dot product (Dp4) circuit in accordance with an embodiment of the present invention.

Referring specifically to FIG. 2A, a value "Fraction_RCP_PI" may be predefined and stored in the circuits implementing the method 2A, where Fraction_RCP_PI is an approximation of 1/π. In some embodiments Fraction_RCP_PI is a 216 bit value: Fraction_RCP_PI[215:0]={0xa2f983_6e4e44_1529fc_2757d1_f534dd_c0db62_95993c_439041_fe5148}.

The method of FIG. 2A includes selecting a portion of Fraction_RCP_PI according to the magnitude of x. For example, the method may including getting 200 the exponent portion (expX) from x and evaluating 202 whether expX is greater than or equal to 25. If not, a value Fraction_EffectBits is set 204 equal to Fraction_RCP_PI[215:215–95], i.e. the first 96 bits of Fraction_RCP_PI. If so, then Fraction_EffectBits is set 2036 equal to Fraction_RCP_PI [215–expX+25:215–expX+25–95], i.e. the 96 bit window moves to the right (lesser significance) by the amount that expX exceeds 25.

Different portions of Fraction_EffectBits and the mantissa of x (manX) are input into the multipliers 100a-100c. In particular Fraction_EffectBits may be divided into high, mid, low1, and low2 values, where high=Fraction_EffectBits[95:72], mid=Fraction_EffectBits [71:48], low1=Fraction_EffectBits[47:24], low2=Fraction_EffectBits[23:0]. Stated differently, Fraction_EffectBits={high[23:0], mid[23:0], low1[23:0], low2[23:0]}, where { } indicates concatenation.

As shown in FIG. 2A, the multipliers 100a-100d calculate 208 a value Mul1 as manX*high; calculate 210 a value Mul2 as manX*mid; calculate 212 a value Mul3 as manX*low1; and calculate 214 a value Mul4 as manX*low2. Inasmuch as separate circuits may implement each multiplier 100a-100c, steps 208-214 may be performed in parallel.

The exponents for Fraction_EffectBits used for Mul1 through Mul4 are calculated by calculating 216 a value ExpOfFraction_EffectBits as the output of the expression (expX>=25)?–2+25–expX:–2, where (a?b:c) is the ternary operator that outputs b if a is true (1) and c if a is false (0). The exponents (expHigh, expMid, expLow1, expLow2) for the portions of Fraction_EffectBits (high, mid, low1, and low2) are calculated 218-224 as:

expHigh=ExpOfFraction_EffectBits
expMid=expHigh–24
expLow1=expHigh–48
expLow2=expHigh–72

As noted above, when multiplying the mantissas of the arguments are multiplied and the exponents are added. Accordingly, for each multiplier output Mul1, Mul2, Mul3, and Mul4, the corresponding exponent will be expX+expHigh, expX+expMid, expX+expLow1, and expX+expLow2, respectively.

Figure 2B:
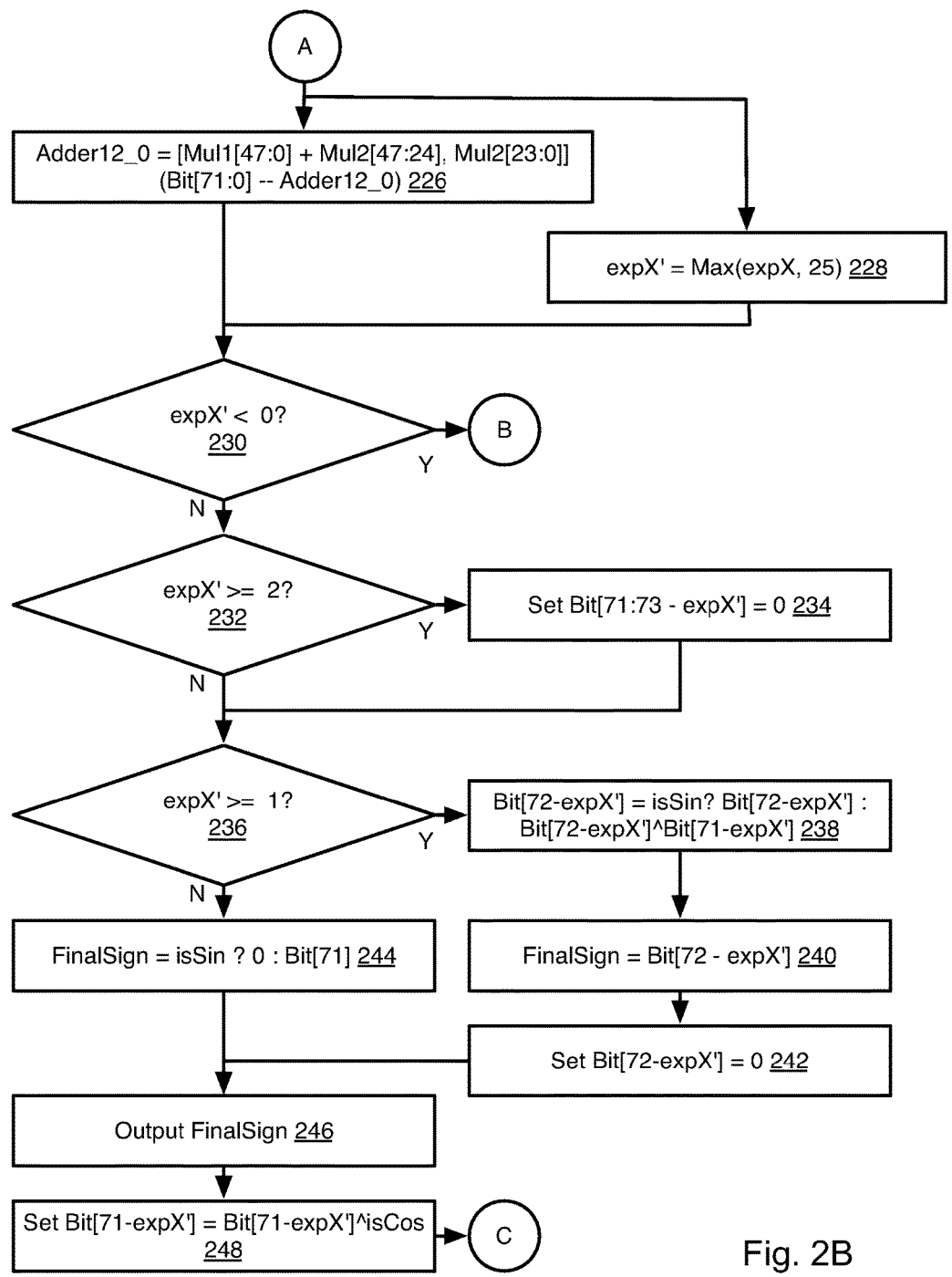

Referring to FIG. 2B, the outputs of the multipliers 100a-100d (i.e. the mantissa portions) may be adjusted in order to implement (1) and avoid loss of precision.

Adder 102a receives Mul1 and Mul2 and outputs the sum thereof at step 226. Mul1 and Mul2 may be shifted and processed such that they are not simply input to the adder 102a. For example, Mul1[47:0] and Mul2[47:24] may be input to the adder 102a. The output of the adder is then concatenated with Mul2[23:0] to obtain a value Adder12_0 having bits Bit[71:0].

A value expX' may be calculated that is equal to the greater of expX and 25 at step 228. If expX' is found 230 to be less than zero, then processing continues with FIG. 2C, described below. If expX' is found 232 to be greater than or equal to two, than Bit[71:73–expX'] is set to zero at step 234.

If expX' is found 236 to be greater than or equal to 1, the Bit[72–expX'] is set 238 equal to (is Sin ? Bit[72–expX']: Bit[72–expX']^Bit[71–expX']), where is Sin is one if an opcode is received that indicates that t will be used as the input argument to Sin Pi( ). For purposes of this disclosure the symbol "^" indicates the XOR (exclusive OR) operation. If expX' is found 236 to be greater than or equal to 1, then a value FinalSign is set 240 equal to Bit[72–expX'], where FinalSign is used to change the sign of the output of adder 106 as described below. Likewise, if expX' is found 236 to be greater than or equal to 1, then Bit[72–expX'] is set 242 equal to zero.

If expX' is not found 236 to be greater than equal to 1, and expX' is not less than zero, then FinalSign is set 244 equal to (is Sin ? 0:Bit[71]).

In either case, FinalSign is output 246 for use in adjusting the output of adder 106 and Bit[71–expX'] is set 248 equal to Bit[71–expX']^is Cos, where is Cos is an opcode is received that indicates that t is to be used to calculate Cos Pi( ), though the approximation of Cos Pi( ) may be obtained by manipulating the output of a circuit implementing Sin Pi(t). In some embodiments a single flag is set, i.e. is Sin may be 1 if the opcode indicates Sin Pi(t) is to be calculated and is otherwise 0. The flag is Cos may be set equal to NOT(is Sin).

Figure 2C:
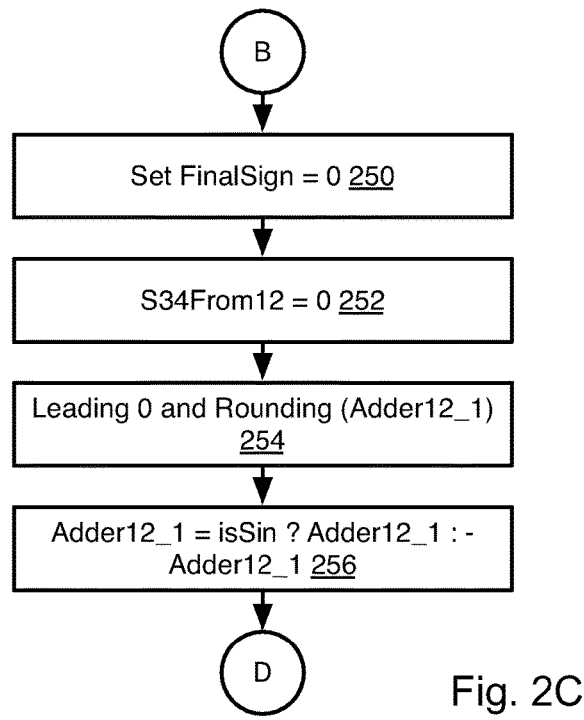

Referring to FIG. 2C, if expX' is found 230 to be less than zero, then FinalSign may be set 250 to zero (no sign change)

and a value S34From 12 is set 252 to zero, the use of the value S34From12 is used to adjust the sign of the output of adder 102b as described below with respect to FIG. 2E. The identification of a leading 0 and rounding is performed 254, resulting in a new floating point value Adder12_1 having a mantissa and exponent based on Adder12_0 and expX', respectively, that have been adjusted according to the position of the leading 0 in Adder12_0 as known in the art. Adder12_1 may be further set 256 equal to (is Sin ? Adder12_1:-Adder12_1).

Figure 2D:
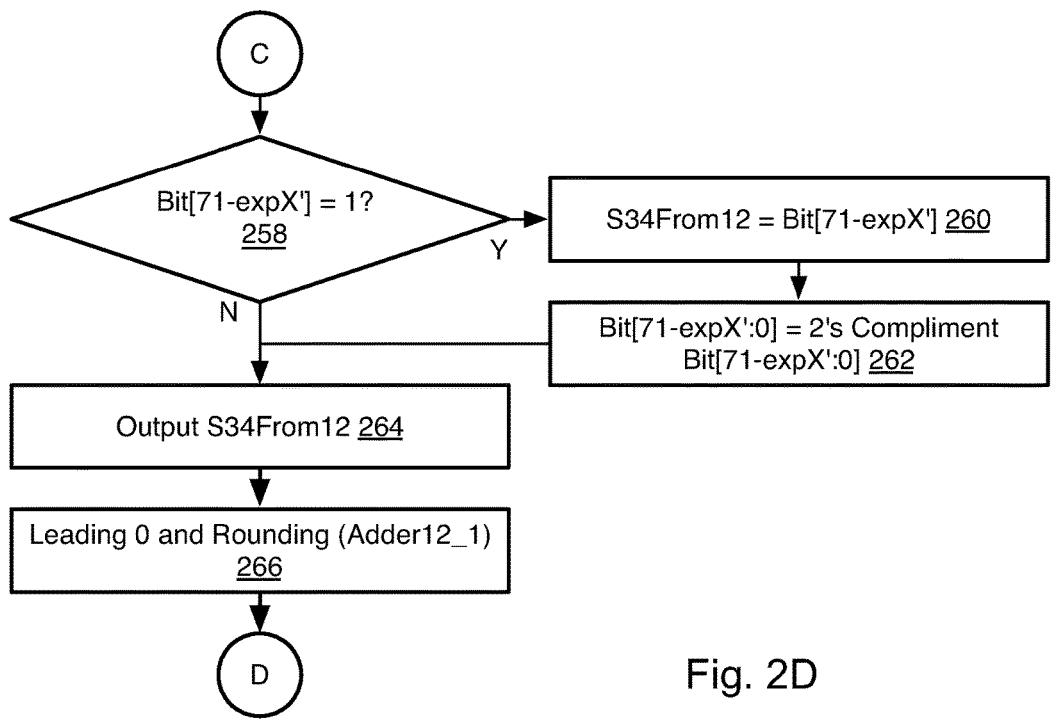
Figure 2E:
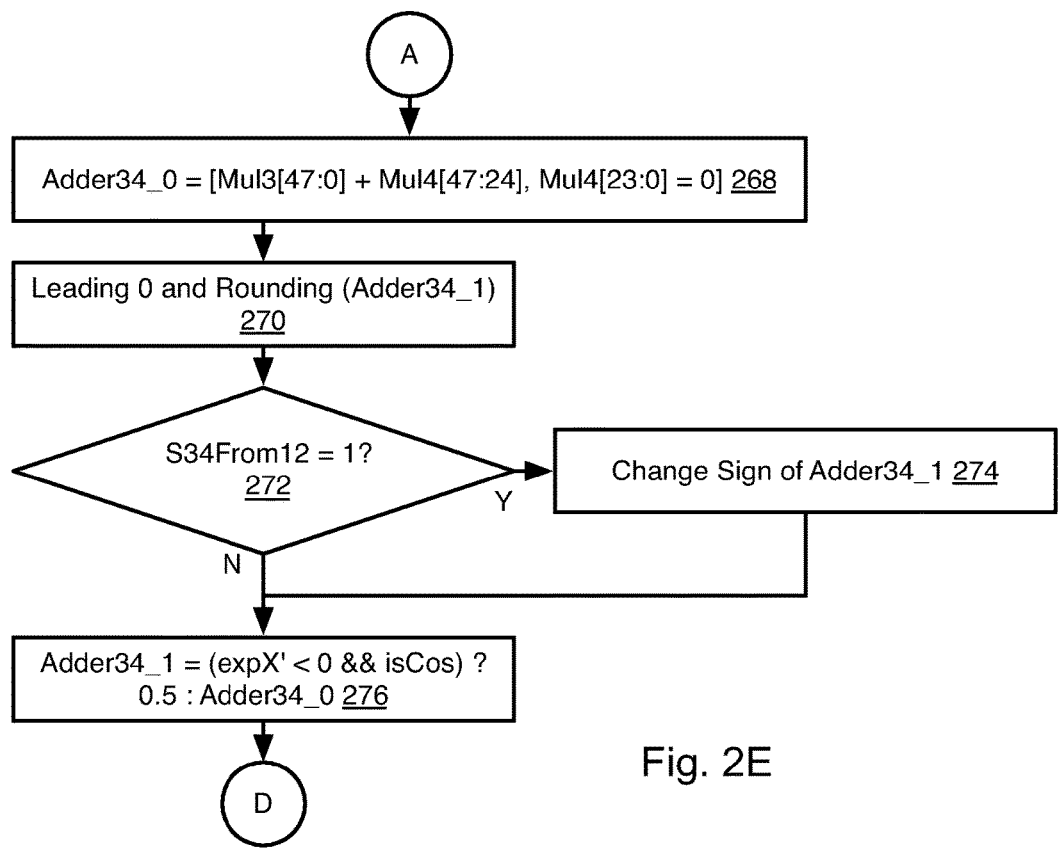

If expX' is not found 230 to be less than zero then the steps of FIG. 2D are executed following the steps of FIG. 2B. In particular, if Bit[71-expX'] is found 258 to be equal to 1, then S34From12 is set 260 equal to Bit[71-expX'] and Bit[71-expX':0] is set 262 equal to the two's compliment of Bit[71-expX':0]. S34From12 is then output 264 and identification of the leading zero and rounding is performed 266 with respect to Adder12_0 in the same manner as for step 254 in order to obtain Adder12_1.

The processing of FIGS. 2B through 2D is performed with respect to the output of adder 102a. The processing of FIG. 2E may be performed in parallel with the processing of FIGS. 2B through 2D in order to process the output of the adder 102b.

A value Adder34_0 may be calculated 268 by inputting Mul3[47:0] and Mul4[47:24] into the adder 102b and concatenating the output of the adder 102b with Mul4[23:0]=0, i.e. 24 bits of zeros. A value Adder34_1 is then calculated by performing 270 identification of a leading 0 and rounding with respect to Adder34_0 in the same manner as described above with respect to the value Adder12_0. If S34From12 is found 272 to be one, then the sign of Adder34_1 is changed. The value of Adder34_1 is further set 276 equal to ((expX'<0 && is Cos) ? 0.5:Adder34:0).

Figure 2F:
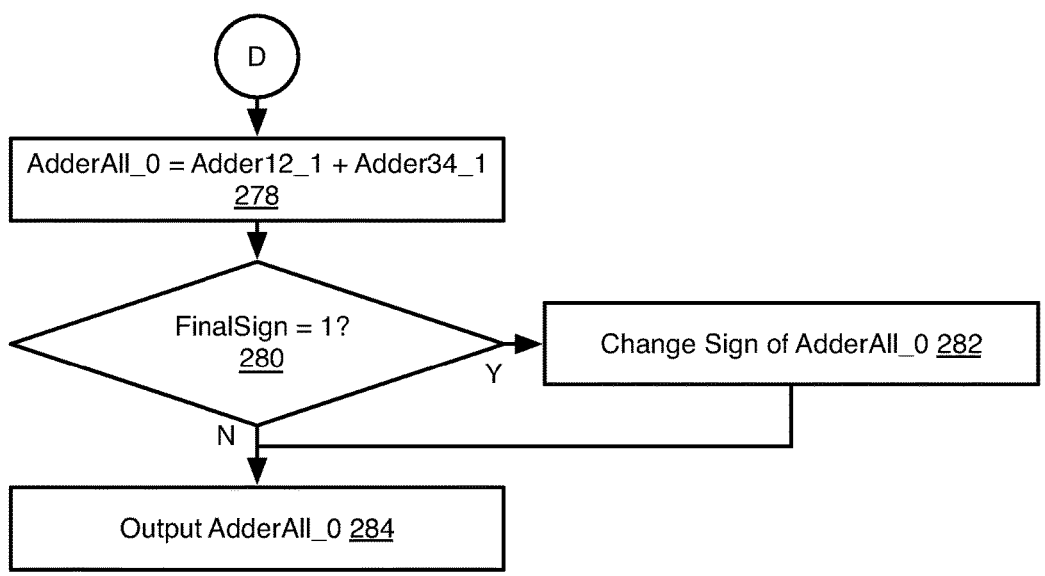

Referring to FIG. 2F, a value AdderAll_0 may then be calculated 278 by inputting Adder12_1 and Adder34_1, as output from the steps of FIGS. 2B through 2E, to the adder 106 and receiving AdderAll_0 as the output of the adder 106. If FinalSign is found 280 to be 1, then the sign of AdderAll_0 is changed. In either case, AdderAll_0 is output and used as the input argument t for a trigonometric function circuit, such as Sin Pi(t), Cos Pi(t), Tan Pi(t), or any other trigonometric function. In particular, where the opcode is is Sin, then t is input to the trigonometric function circuit corresponding to Sin Pi(t). Where the opcode is is Cos, then t is input to the trigonometric function circuit corresponding to Cos Pi(t). Other opcodes may invoke the input oft to other trigonometric circuits.

The input argument t (AdderAll_0) includes a mantissa (ManT) and an exponent (ExpT) determined according to the mantissa and exponent of Adder12_1 and Adder34_1 as determined according to the leading 0 and rounding steps 266, 270. In some embodiments, if t>=2, then t is set equal to $t/(2^{128})$ prior to inputting t to Sin Pi( ). This is a simple operation and requires only operation on ExpT: ExpT=ExpT−128.

An explanation and example of how the circuits described above may be used is described below.

Assume an input is a float format x, exponent of expX=exp(x), mantissa of manX=man(x). The method includes saving 216 bits of the fraction of $1/\pi$ (exp of $1/\pi$ is −2). So $1/\pi$=Fraction_rcp_pi[215:0]*$2^{-218}$, with Fraction_rcp_pi[215]=1.

If Fraction_rcp_pi is written hex form, it is Fraction_r cp_pi[215:0]={0xa2f983_6e4e44_1529fc_2757d1_ f534dd_c0db62_95993c_439041_fe5148}. The exponent part for Fraction_rcp_pi=−2 (the most significant bit 1 means 0.25), following (2).

96 bits of Fraction_rcp_pi are then selected based on the magnitude of expX. Mathematically, $x/\pi$=manX*Fraction_rcp_pi[215:0]*$2^{-218+expX-23}$. If this were fully implemented, one would need a 24×216 bit integer multiplier, which would require a very large area. Since the result only keeps 24 bits of the mantissa part in the fraction, there is no need for such as a huge multiplier.

When expX is very large, x/pi will generate many integer bits which are useless for the precision of sin(x). So part of fraction_rcp_pi are selected:

Fraction_EffectBits[95:0]=(expX)≥25 ? Fraction_rcp_pi [215-expX+25:215-expX+25-95]: Fraction_rcp_pi [215: 215-95].

Values high, mid, low1, low2 are selected from the 96 bits of the valid fraction Fraction_EffectBits: {high[23:0], mid [23:0], low1[23:0], low2[23:0]}=Fraction_EffectBits [95:0].

The Dp4 engine described above (FIG. 1) is then used to calculate manX*Fraction_EffectBits [95:0]:

manX*Fraction_EffectBits [95:0]=manX*high+ manX*mid+manX*low1+manX*low2=mul1+mul2+mul3+ mul4

The ExpOfFranction_EffectBits=(expX)≥25 ?−2+25− expX:−2.

The expHigh=ExpOfFranction_EffectBits, expMid=expHigh−24, expLow1=expHigh−48, and expLow2=expHigh−72.

Since mul1+mul2 do not have any cancellation, Adder12_0 outputs a 72 bit mantissa (mantissaAdder12_0) and an exponent expAdder12_0=expHigh+expX+1.

When expX≥25, expAdder12_0=24, this means that 1's bit at position 71−24=47. We can remove (set value zero) mantissaExpAdder12_0[71:48], which represent some even integer number of $x/\pi$. Since expMul1=expMul2+2 and only a 48 bit adder is used in Dp4, we set mantissaAdder12_0 [71:24]=(Mul1[47:0]<<24)+Mul2[47:24], and pass Mul2 [23:0] to mantissaAdder12_0[23:0]

The variable mantissaAdder12_0[47:47] is the sign bit of the final result AdderAll. Then Final Sign=mantissaAdder12_0[47:47], after setting the sign bit information to AddAll, we set mantissaAdder12_0[47:47] to zero too.

The variable mantissaExpAdder12_0[46:46] indicates frac(|x|/π)≥0.5 or not, which decides whether the $2^{nd}$ row or $1^{st}$ row of formula (1) to apply. Therefore, let S34From12=mantissaExpAdder12_0[46:46], we change mantissaExpAdder12_0[46:0] as:

mantissaAdder12_0[46:0]=mantissaAdder12_ 0[46:0]^S34From12+S34From12     (5)

We further output S34From12 as the sign bit of Adder34. Formula (5) processes $$\left((\text{int})\left(\frac{|x|}{\pi}\right) + 1 - \frac{|x|}{\pi}\right)$$

during S34From12=1 for Adder12_0 part with 2's complement, and changes the sign for Adder34 thereby making subtraction happen.

After making such change, we output the modified Adder12_0 to the Leading 0 and rounding step, to get Adder12 with new expAdder12 and mantissaAdder12 with 48 bit precision after rounding. Adder34_0 to Adder34_1 is the same as the previous Dp4 process, but the sign bit of Adder34 may change to S34From12.

When 1≤expX<25, high=Fraction_rcp_pi[215:215−23].

The value expAdder12_0=expHigh+expX+1=expX−1. Since the 1's position of Adder12_0 is at 71−(expX−1). As for handling expX≥25, we set mantissaAdder12_0[71:73−expX] to zero, if 73−expX≤71. And pass the 1's position bit mantissaAdder12_0[72−expX: 72−expX] to the sign of AdderAll. Then FinalSign=mantissaAdder12_0[72−expX: 72−expX]. After setting the sign bit information to Adder-All, we set mantissaAdder12_0[72−expX: 72−expX] to zero. S34From12=mantissaAdder12_0[71−expX: 71−expX] (½'s position), and we get:

mantissaAdder12_0[71−exp$X$:0]=mantissaAdder12_0 [71−exp$X$:0]^S34From12+S34From12   (6)

We further output S34From12 as the sign bit of Adder34. Formula (6) processes $$\left((\text{int})\left(\frac{|x|}{\pi}\right) + 1 - \frac{|x|}{\pi}\right)$$

during S34From12=1 for Adder12_0 part with the 2's complement, and changes the sign for Adder34 thereby making subtraction happen.

After making such change, we output the modified Adder12_0 to the Leading 0 and rounding step, to get Adder12_1 with new expAdder12 and mantissaAdder12 with 48 bit precision after rounding. Adder34_0 to Adder34_1 is the same as the previous Dp4 process, however the sign bit of Adder34_1 may change to S34From12.

When expX=0, the ½'s position is at 71. S34From12=Adder12_0[71:71] and formula (6) also applies. Adder12_0 passes to Leading 0 and rounding step, to get Adder12 with new expAdder12 and mantissaAdder12 with 48 bit precision after rounding.

Adder34_0 to Adder34_1 is same as previous Dp4 process, however the sign bit of Adder34 may change to S34From12.

When expX<0, $$|x| < 1.0, \frac{|x|}{\pi} < 0.32 < 0.5,$$

the ½'s bit is always 0. Adder12_0 passes to Leading 0 and rounding step, to get Adder12_1 with new expAdder12 and matissaAdder12 with 48 bit precision after rounding. Adder34_0 to Adder34_1 is same as previous Dp4 process. However, we can truncate the LSB 24 bits of Mul4.

Although leading zero calculation looks to have 71 bits of mantissaAdder12_0, actually, we only put 48 bit of mantissaAdder12_0[½'s pos−1: ½'s_pos−48] to leading zero calculation. For all the single precision, there are at most 32 zeros after mantissaAdder12_0[½'s pos].

Formula (6) may have 71 bit fix point adder (+1 after performing NOT, if S34From12=1). We can do a little simplification, since mantissaAdder12_0=Fraction_rcp_pi [215:215−23]*manX=0xa2f983_6e4e44*manX. There are at most 23+2 LSB zeros, so we only need to calculate ~MantissaAdder12_0[0,25]+1 for the LSB 26 bit, and for the rest MSB we only do ~(NOT) operation. This separates the 71 bit 2's complement to 26 bit 2's complement and a 45 bit NOT operation.

After leading zero calculation, we only keep mantissaAdder12 with 48 bit precision. The question is, if the 48 bit accuracy is enough? Since Adder12 may cancel some bits with Adder34 if subtraction happens (S34From12=1 case). Since the mantissaAdder34[47,47] align with mantissaAdder12_0[23,23], cancellation only happens when mantissaAdder12_0 leading zero is at 23 or 24. In both cases, we have full precision of Adder12 and keeping 48 bit mantissa.

Keeping 48 bit of mantissaAdder34 is acceptable, although we cannot theoretical prove it (theoretically, 24 bit of MSB of mantissaAdder34 maybe canceled out, leaving only 24 bit precision). However, since we exhausted all the floating point value, the maximum number of bits that cancel out on mantissaAdder34 is 8. This means we keeps at least 40 effective bits after Adder12_1+Adder34_1. This means that we can use 32 bits mantissa for Adder12_0 and Adder34_1 in order to get AddAll with 24 bit mantissa accuracy.

The following example deals with using the circuits described above to calculate Cos(x)=Sin(x+0.57π)=Sin (0.5π−x). Adding 0.5π is same as adding 1 to Adder12_0 at ½'s position. Of cause we have to know the ½'s position. If we were to add 1 at ½'s position, we would need another fixed point adder. In some embodiments, we only calculate S34From12, FinalSign according to follow condition:

TABLE 1

| FinalSign and S34From12 for Cos(x) | | |
|---|---|---|
| Adder12_0[1's_pos: ½'s pos], 2 bits value | FinalSign | S34From12 |
| 0 | 0 | 1 |
| 1 | 1 | 0 |
| 2 | 1 | 1 |
| 3 | 0 | 0 |

Formula (5) still applies for expX≥25 when calculating Cos(x). Formula (6) likewise applies for 0≤expX<25. For expX<0, Cos(x)=Sin(0.5π−x)=Sin Pi(0.5−x/π), we just change Adder12 sign to negative, and force Adder34 to be 0.5 (expAdder34=−1, mantissaAdder34=1<<47). Then we have 0.5−x/π with enough precision at AdderAll, since we have 48 bit high precision at adder12.

The following example deals with calculating Sin(x) with 31 bits of leading 0. This example assumes X=0x67098498; (S=0, expX=79, manX=0x898498) and Fraction_rcp_pi [215:0]={0xa2f983_6e4e44_1529fc_2757d1_ f534dd_c0db62_95993c_439041_fe5148};

Step1 is to select 96 bits valid fraction according to the function Fraction_EffectBits[95:0]=(expX)≥25 ? Fraction_rcp_pi [215−expX+25:215−expX+25−95]: Fraction_rcp_pi [215:215−95]. We left shift 79−25 bits of Fraction_rcp_pi [215:0], then get high 96 bits, so Fraction_EffectBits[95:0]=4a7f09_d5f47d_4d3770_36d8a5.

Since we left shift Fraction_EffectBits 54 bits, the exponent of Fraction_EffectBits is ExpOfFranction_EffectBits=−2−54 (the initial exponent of Fraction_rcp_pi is −2).

Step 2 is to use the DP4 engine to calculate manX*Fraction_EffectBits[95:0]. First we set {high[23:0], mid[23:0], low1[23:0], low2[23:0]}=Fraction_EffectBits [95:0]. We therefore have manX*Fraction_EffectBits [95:0]=manX*high+manX*mid+manX*low1+ manX*low2=mul1+mul2+mul3+mul4.

In Step 2 all multiply results keep 48 bits mantissa, and multiply four exponents as follows:
exp_of_mul1=79+(−2−54)+1=24;
mul1=0x280491_8d1158;
exp_of mul2=exp_of_mul1−24; mul2=0x72eea7_fe9e38;
exp_of mul3=exp_of_mul1−48; mul3=0x297aa9_5eaa80; and
exp_of mul4=exp_of_mul1−72; mul4=0x1d7658_92b5f8.

The four multiply result should be alignment as shown in Table 2.

TABLE 2

Alignment of Multiply results

| | | | |
|---|---|---|---|
| 24'b | 48 Bits man2 | | |
| 24'b | 24'b | 48 bits man3 | |
| 24'b | 24'b | 24'b | 48 bits man4 |

In Step 3 we use two parallel adder calculate Adder12_0 and Adder34_0 separately. In this step we use a 72 bits adder calculate Adder12=mul0+mul1. In some implementations, an actual 72 bit adder is not implemented. Instead, a Dp4 engine may only have a 48 bit adder. Accordingly Adder12_0 is calculated as Adder12_0[71:24]]=Mul1 [47:0]+Mul2[47:24] (aligned LSBs) and Adder12_0[23:0] is set equal to Mul2[23:0].

In the illustrated example this gives Adder12_0 [71:0]=0x280491_FFFFFF_fe9e38. Since the 1's position at 47, we set the bits above 47 to zero, and move bit-47 to the final sign, i.e. FinalSign=1, mantissaAdder12_0[71:0]=0x000000_7FFFFF_FE9E38, since mantissaAdder12_0[46:46]=1, i.e. S34From12=1, and mantissaAdder12_0[46:0]=(mantissaAdder12_0[46:0] ^0x7FFFFF_FFFFFF)+1=0x000000_0161c8.

Finally, we performing finding the leading 0 (31) and rounding (not need rounding in this case). We therefore have expAdder12=−31, mantissaAdder12=0xB0E400000000

Step 3 further includes getting Adder34_1, which may include performing processing according to an unmodified Dp4 engine. In some embodiments Adder34_0[47:0] is set equal to Mul3[47:0]+Mul4[47:24] (aligned at LSBs). Mul4 [23:0] is simply ignored.

In this example, this gives Adder34_0 [47:0]=0x297AA9_7C20D8, with leading 0=2. Adder34_0 is therefore normalized to obtain Adder34_1:expAdder34=−24−2=−26, mantissaAdder34[47:0]=0x A5EAA5_F08360, signAdder34=S34From12=1.

In Step 4, we calculate (Adder12+Adder34) with FinalSign. Since expAdder34=expAdder12+5, we scale the mantissaAdder12 by 1/32 and to proceed to adding. Consider the sign of Adder34 is different from the sign of Adder12, we have
mantissaAdderAll=|0xB0E400000000/32−0x A5EAA5_F08360|=0xA06385_F08360,
expAdderAll=expAdder34−leading0(mantissaAdderAll)=−26, and
signAdder12=signAdder34 ^ Final Sign=1^1=0.
With rounding, we have final output t= 0xA06386*2^{−26}*2^{−23}

If we remove the hide 1, and get the hex expression Hex(t)=0x32A06386.

Figure 3:
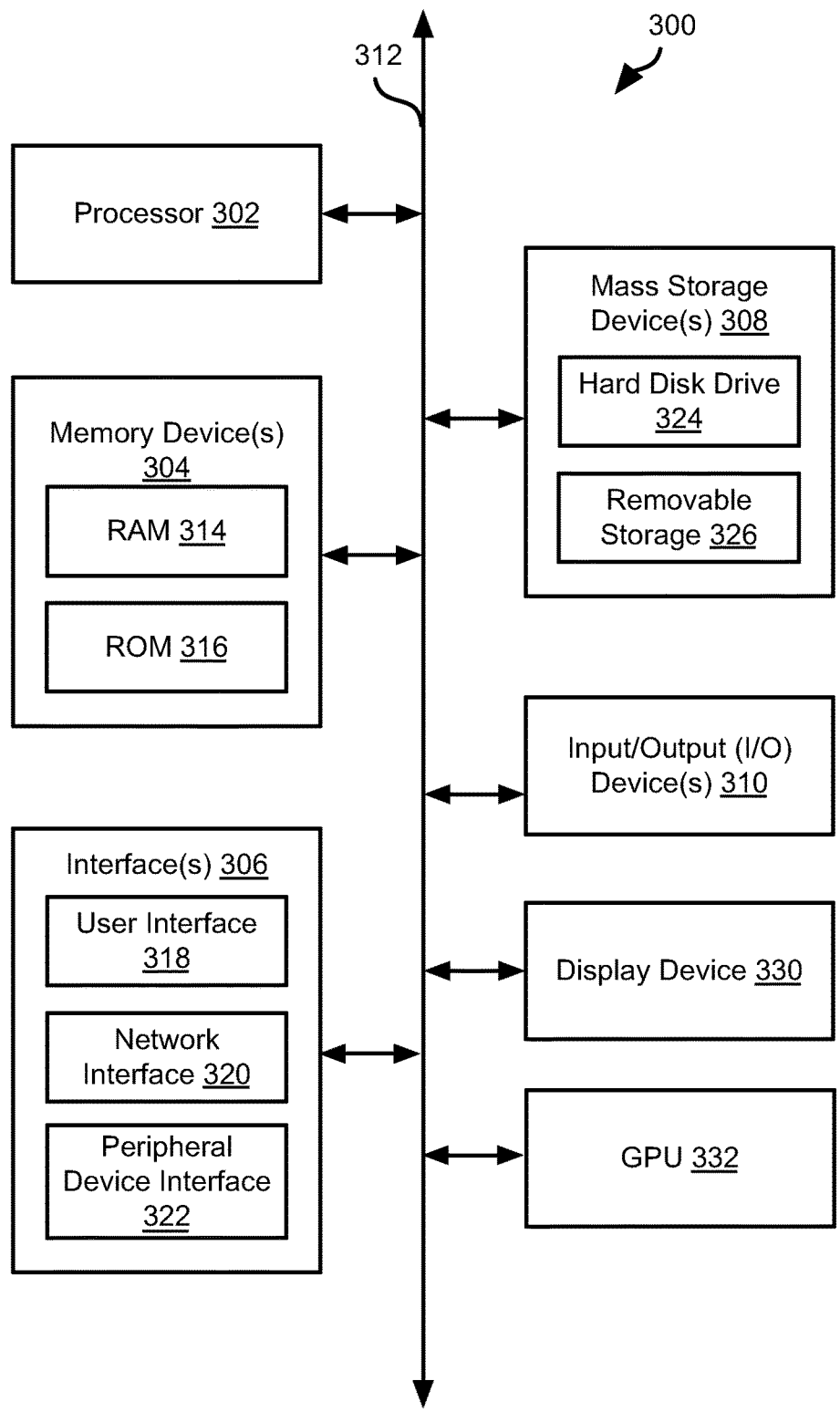
FIG. 3 is a diagram of a computing device in which the circuits disclosed herein may be implemented.

FIG. 3 is a block diagram illustrating an example computing device 300. Computing device 300 may be used to perform various procedures, such as those discussed herein. Computing device 300 can function as a server, a client, or any other computing entity. Computing device can incorporate a circuit performing the methods disclosed herein, and can execute one or more application programs, such as the application programs that invoke the methods disclosed herein to calculate trigonometric functions. Computing device 300 can be any of a wide variety of computing devices, such as a desktop computer, a notebook computer, a server computer, a handheld computer, tablet computer, and the like.

Computing device 300 includes one or more processor(s) 302, one or more memory device(s) 304, one or more interface(s) 306, one or more mass storage device(s) 308, one or more Input/Output (I/O) device(s) 310, and a display device 330 all of which are coupled to a bus 312. Processor(s) 302 include one or more processors or controllers that execute instructions stored in memory device(s) 304 and/or mass storage device(s) 308. Processor(s) 302 may also include various types of computer-readable media, such as cache memory.

Memory device(s) 304 include various computer-readable media, such as volatile memory (e.g., random access memory (RAM) 314) and/or nonvolatile memory (e.g., read-only memory (ROM) 316). Memory device(s) 304 may also include rewritable ROM, such as Flash memory.

Mass storage device(s) 308 include various computer readable media, such as magnetic tapes, magnetic disks, optical disks, solid-state memory (e.g., Flash memory), and so forth. As shown in FIG. 3, a particular mass storage device is a hard disk drive 324. Various drives may also be included in mass storage device(s) 308 to enable reading from and/or writing to the various computer readable media. Mass storage device(s) 308 include removable media 326 and/or non-removable media.

I/O device(s) 310 include various devices that allow data and/or other information to be input to or retrieved from computing device 300. Example I/O device(s) 310 include cursor control devices, keyboards, keypads, microphones, monitors or other display devices, speakers, printers, network interface cards, modems, lenses, CCDs or other image capture devices, and the like.

Display device 330 includes any type of device capable of displaying information to one or more users of computing device 300. Examples of display device 330 include a monitor, display terminal, video projection device, and the like.

A graphics-processing unit (GPU) 332 may be coupled to the processor(s) 302 and/or to the display device 330. The GPU may be operable to render computer generated images and perform other graphical processing. The GPU may include some or all of the functionality of a general-purpose processor, such as the processor(s) 302. The GPU may also include additional functionality specific to graphics processing. The GPU may include hard-coded and/or hard-wired graphics function related to coordinate transformation, shading, texturing, rasterization, and other functions helpful in rendering a computer generated image.

Interface(s) 306 include various interfaces that allow computing device 300 to interact with other systems, devices, or computing environments. Example interface(s) 306 include any number of different network interfaces 320, such as interfaces to local area networks (LANs), wide area networks (WANs), wireless networks, and the Internet. Other interface(s) include user interface 318 and peripheral device interface 322. The interface(s) 306 may also include one or more user interface elements 318. The interface(s) 306 may also include one or more peripheral interfaces such as interfaces for printers, pointing devices (mice, track pad, etc.), keyboards, and the like.

Bus 312 allows processor(s) 302, memory device(s) 304, interface(s) 306, mass storage device(s) 308, and I/O device(s) 310 to communicate with one another, as well as other devices or components coupled to bus 312. Bus 312 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 300, and are executed by processor(s) 302. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What are claimed are listed below:

1. A system comprising:
    a four element dot product circuit (Dp4) configured to—
        (a) receive four first inputs (v1, v2, v3, v4) and four second inputs (u1, u2, u3, u4);
        (b) input the four first inputs and four second inputs to four multipliers (Mul1, Mul2, Mul3, and Mul4);
        (c) input outputs of multipliers Mul1 and Mul2 to an adder Adder12;
        (d) input outputs of multipliers Mul3 and Mul4 to an adder Adder34;
        (e) input outputs of Adder12 and Adder34 into an adder AdderAll;
        (f) output an output of AdderAll;
    a trigonometric circuit configured to—
        calculate an estimate of x/pi by inputting a representation of 1/pi and x to the multipliers Mul1, Mul2, Mul3, Mul4;
        process the outputs of the multipliers Mul1, Mul2, Mul3, and Mul4 using adders Adder12, Adder34, and AdderAll to compute t effective to increase an accuracy of an output of a trigonometric function circuit receiving t as an input argument with respect to a theoretically correct value for a trigonometric function corresponding to the trigonometric function circuit and taking x/pi as an input as compared to the output of the trigonometric circuit for Mul1+Mul2+Mul3+Mul4 as the input argument.

2. The system of claim 1, wherein the trigonometric circuit is further configured to process the outputs of the multipliers Mul1, Mul2, Mul3, and Mul4 using adders Adder12, Adder34, and AdderAll effective to calculate t effective to approximate $$t = \begin{cases} \left(\frac{|x|}{\pi} - (\text{int})\left(\frac{|x|}{\pi}\right)\right) * (-1)^{(\text{int})\left(\frac{|x|}{\pi}\right)} * \text{Sign}(x), & |x| > 2^{-24}, \quad \text{frac}\left(\frac{|x|}{\pi}\right) < 0.5 \\ \left((\text{int})\left(\frac{|x|}{\pi}\right) + 1 - \frac{|x|}{\pi}\right) * (-1)^{(\text{int})\left(\frac{|x|}{\pi}\right)} * \text{Sign}(x), & \text{frac}\left(\frac{|x|}{\pi}\right) \geq 0.5 \\ x * 2^{128} & |x| \leq 2^{-24} \end{cases}.$$

3. The system of claim 2, wherein the trigonometric circuit is further configured to calculate the estimate of x/pi by:
    selecting a portion (Fraction_EffectBits) of a binary representation of 1/pi (Fraction_RCP_PI) according to the magnitude of an exponent portion of x (expX) such that significance of Fraction_EffectBits within Fraction_RCP_PI decreases with magnitude of expX.

4. The system of claim 3, wherein Fraction_RCP_PI has 216 bits; and
    wherein the trigonometric circuit is further configured to select Fraction_EffectBits by:
    if expX is greater than or equal to 25, Fraction_EffectBits=Fraction_RCP_PI[215:215−95]; and
    if expX is not greater than or equal to 25, Fraction_EffectBits=Fraction_RCP_PI[215−expX+25: 215−expX+25−95].

5. The system of claim 4, wherein the trigonometric circuit is further configured to calculate the estimate of x/pi by:
    segmenting Fraction_RCP_PI into four portions High, Mid, Low1, and Low2;
    multiplying a mantissa of x (manX) by High in Mul1;
    multiplying manX by Mid in Mul2;
    multiplying manX by Low1 in Mul3; and
    multiplying manX by Low2 in Mul4.

6. The system of claim 5, wherein the trigonometric circuit is further configured to calculate the estimate of x/pi by:
    defining ExpOfFraction_EffectBits=(expX>=25)? 2+25−expX:2;
    multiplying manX by High in Mul1 with an exponent of High (expHigh) equal to ExpOfFraction_EffectBits;
    multiplying manX by Mid in Mul2 with an exponent of Mid (expMid) equal to expHigh−24;
    multiplying manX by Low1 in Mul3 with an exponent of Low1 (expLow1) equal to expHigh−48; and
    multiplying manX by Low2 in Mul4 with an exponent of Low2 (expLow2) equal to expHigh−72.

7. The system of claim 1, wherein the trigonometric circuit is configured to process the outputs of the multipliers Mul1, Mul2, Mul3, and Mul4 using the adders Adder12, Adder34, and AdderAll effective to calculate t by:
    if expX is less than zero, and setting a value FinalSign equal to 0, such that a sign of the output of AdderAll is not changed by the trigonometric circuit.

8. The system of claim 7, wherein the trigonometric circuit is configured to receive at least an opcode and set a value isSign equal to 1 if the opcode indicates Sine and set a value isCos equal to 1 if the opcode indicates Cosine; and
    wherein the trigonometric circuit is configured to process the outputs of the multipliers Mul1, Mul2, Mul3, and Mul4 using the adders Adder12, Adder34, and AdderAll effective to calculate t by:
    if expX is greater than 25, setting expX' equal to 25;
    if expX is less than or equal to 25, setting expX' equal to expX;
    inputting the output of Mul1 and bits 47−24 of the output of Mul2 into Adder12;
    setting a value Adder12_0 including 72 bits (Bit[71:0]) equal to the output of Adder12 concatenated with bits 23−0 of the output of Mul2;
    process Adder12_0 by—
        first, if expX' is greater than or equal to 2, setting Bit[71:73−expX']=0;

second, if expX' is greater than or equal to 1, (a) setting Bit[72-ExpX']=is Sin ? Bit[72-ExpX']:Bit[72-ExpX']^Bit[71-ExpX'], then (b) setting FinalSign equal to Bit[72-ExpX'], then (c) setting Bit[72-ExpX']=0;

third, if expX' is not greater than or equal to 1 and is not less than zero, set FinalSign=is Sin ? 0:Bit[71]; and fourth, if expX' is not less than zero, set Bit[71-ExpX']=Bit[71-ExpX']^is Cos.

9. The system of claim 8, wherein the trigonometric circuit is configured to process the outputs of the multipliers Mul1, Mul2, Mul3, and Mul4 using the adders Adder12, Adder34, and AdderAll effective to calculate t by:

if expX' is less than zero, (a) setting FinalSign equal to zero, (b) setting a value S34From12 equal to zero, (c) calculating Adder12_1 by performing leading 0 and rounding with respect to Adder12_0, (d) set Adder12_1=is Sin ? Adder12_1:-Adder12_1;

if expX' is not less than zero and Bit[71-ExpX'] is equal to 1, (a) setting S34From12 equal to Bit[71-ExpX'], (b) setting Bit[71-ExpX':0] equal to a two's compliment of Bit[71-ExpX':0];

if expX' is not less than zero, calculating Adder12_1 by performing leading 0 and rounding with respect to Adder12_0.

10. The system of claim 9, wherein the trigonometric circuit is configured to process the outputs of the multipliers Mul1, Mul2, Mul3, and Mul4 using the adders Adder12, Adder34, and AdderAll effective to calculate t by:

inputting the output of Mul3 and bits 47-24 of the output of Mul4 into Adder34;

setting a value Adder34_0 including 48 bits equal to the output of Adder34 concatenated with bits 23-0 of the output of Mul4;

calculating Adder34_1 by performing leading 0 and rounding with respect to Adder34_0;

if S34From12 has been set to 1, changing the sign of Adder34_1; and setting Adder34_1 equal to (expX'<0 && is Cos) ? 0.5:Adder34_0.

11. The system of claim 10, wherein the trigonometric circuit is configured to process the outputs of the multipliers Mul1, Mul2, Mul3, and Mul4 using the adders Adder12, Adder34, and AdderAll effective to calculate t by:

calculating AdderAll_0 using AdderAll as a sum of Adder12_1 and Adder34_1;

if FinalSign is equal to 1, changing the sign of AdderAll_0;

outputting AdderAll_0 as t;

if t>=0, set t=t/$2^{128}$;

inputting t to a trigonometric function circuit configured to approximate at least one of Sin Pi(t) and Cos Pi(t).

12. A method comprising:
calculating a four element dot product circuit (Dp4) by—
(a) receiving four first inputs (v1, v2, v3, v4) and four second inputs (u1, u2, u3, u4);
(b) inputting the four first inputs and four second inputs to four multipliers (Mul1, Mul2, Mul3, and Mul4);
(c) inputting outputs of multipliers Mul1 and Mul2 to an adder Adder12;
(d) inputting outputs of multipliers Mul3 and Mul4 to an adder Adder34;
(e) inputting outputs of Adder12 and Adder34 into an adder AdderAll;
(f) outputting an output of AdderAll;

using Mul1, Mul2, Mul3, Mul4, Adder12, Adder34, and AdderAll— calculating an estimate of x/pi by inputting a representation of 1/pi and x to the multipliers Mul1, Mul2, Mul3, Mul4;

processing the outputs of the multipliers Mul1, Mul2, Mul3, and Mul4 using adders Adder12, Adder34, and AdderAll effective to calculate t by approximating the function:

$$t = \begin{cases} \left(\frac{|x|}{\pi} - (int)\left(\frac{|x|}{\pi}\right)\right) * (-1)^{(int)(\frac{|x|}{\pi})} * \text{Sign}(x), & |x| > 2^{-24}, \quad frac\left(\frac{|x|}{\pi}\right) < 0.5 \\ \left((int)\left(\frac{|x|}{\pi}\right) + 1 - \frac{|x|}{\pi}\right) * (-1)^{(int)(\frac{|x|}{\pi})} * \text{Sign}(x), & frac\left(\frac{|x|}{\pi}\right) \geq 0.5 \\ x * 2^{128} & |x| \leq 2^{-24} \end{cases}$$

13. The method of claim 12, wherein processing the outputs of the multipliers Mul1, Mul2, Mul3, and Mul4 using adders Adder12, Adder34, and AdderAll effective to calculate t comprises:

selecting a portion (Fraction_EffectBits) of a binary representation of 1/pi (Fraction_RCP_PI) according to the magnitude of an exponent portion of x (expX) such that significance of Fraction_EffectBits within Fraction_RCP_PI decreases with magnitude of expX.

14. The method of claim 13, wherein Fraction_RCP_PI has 216 bits; and
the method further comprising selecting Fraction_EffectBits by:
if expX is greater than or equal to 25, Fraction_EffectBits=Fraction_RCP_PI[215:215-95]; and
if expX is not greater than or equal to 25, Fraction_EffectBits=Fraction_RCP_PI[215-expX+25:215-expX+25-95].

15. The method of claim 3, wherein calculating the estimate of x/pi comprises:
segmenting Fraction_RCP_PI into four portions High, Mid, Low1, and Low2;
multiplying a mantissa of x (manX) by High in Mul1;
multiplying manX by Mid in Mul2;
multiplying manX by Low1 in Mul3; and
multiplying manX by Low2 in Mul4.

16. The method of claim 15, wherein calculating the estimate of x/pi further comprises:
defining ExpOfFraction_EffectBits=(expX>=25) ? 2+25-expX:2;
multiplying manX by High in Mul1 with an exponent of High (expHigh) equal to ExpOfFraction_EffectBits;
multiplying manX by Mid in Mul2 with an exponent of Mid (expMid) equal to expHigh-24;
multiplying manX by Low1 in Mul3 with an exponent of Low1 (expLow1) equal to expHigh-48; and
multiplying manX by Low2 in Mul4 with an exponent of Low2 (expLow2) equal to expHigh-72.

17. The method of claim 12, wherein processing the outputs of the multipliers Mul1, Mul2, Mul3, and Mul4 using adders Adder12, Adder34, and AdderAll effective to calculate t further comprises:
if expX is less than zero, and setting a value FinalSign equal to 0, such that a sign of the output of AdderAll is not changed by the trigonometric circuit.

18. The method of claim 17, further comprising receiving at least an opcode and set a value isSign equal to 1 if the opcode indicates Sine and set a value is Cos equal to 1 if the opcode indicates Cosine; and wherein processing the outputs of the multipliers Mul1, Mul2, Mul3, and Mul4 using adders Adder12, Adder34, and AdderAll effective to calculate t further comprises:

if expX is greater than 25, setting expX' equal to 25;

if expX is less than or equal to 25, setting expX' equal to expX;

inputting the output of Mul1 and bits 47-24 of the output of Mul2 into Adder12;

setting a value Adder12_0 including 72 bits (Bit[71:0]) equal to the output of Adder12 concatenated with bits 23-0 of the output of Mul2;

processing Adder12_0 by—
- first, if expX' is greater than or equal to 2, setting Bit[71:73-expX']=0;
- second, if expX' is greater than or equal to 1, (a) setting Bit[72-ExpX']=is Sin ? Bit[72-ExpX']:Bit[72-ExpX']^Bit[71-ExpX'], then (b) setting FinalSign equal to Bit[72-ExpX'], then (c) setting Bit[72-ExpX']=0;
- third, if expX' is not greater than or equal to 1 and is not less than zero, set FinalSign=is Sin ? 0:Bit[71]; and
- fourth, if expX' is not less than zero, set Bit[71-ExpX']=Bit[71-ExpX']^is Cos.

19. The method of claim 18, wherein processing the outputs of the multipliers Mul1, Mul2, Mul3, and Mul4 using adders Adder12, Adder34, and AdderAll effective to calculate t further comprises:

if expX' is less than zero, (a) setting FinalSign=0, (b) setting a value S34From12 equal to zero, (c) calculating Adder12_1 by performing leading 0 and rounding with respect to Adder12_ 0, (d) set Adder12_1= is Sin ? Adder12_1:-Adder12_1;

if expX' is not less than zero and Bit[71-ExpX'] is equal to 1, (a) setting S34From12 equal to Bit[71-ExpX'], (b) setting Bit[71-ExpX':0] equal to a two's compliment of Bit[71-ExpX':0]; and if expX' is not less than zero, calculating Adder12_1 by performing leading 0 and rounding with respect to Adder12_1.

20. The method of claim 19, wherein processing the outputs of the multipliers Mul1, Mul2, Mul3, and Mul4 using adders Adder12, Adder34, and AdderAll effective to calculate t further comprises:

inputting the output of Mul3 and bits 47-24 of the output of Mul4 into Adder34;

setting a value Adder34_0 including 48 bits (Bit[47:0]) equal to the output of Adder34 concatenated with bits 23-0 of the output of Mul4;

calculating Adder34_1 by performing leading 0 and rounding with respect to Adder34_0;

if S34From12 has been set to 1, changing the sign of Adder34_1;

setting Adder34_1 equal to (ExpX'<0 && is Cos) ? 0.5:Adder34_1;

calculating AdderAll_1 using AdderAll as a sum of Adder12_1 and Adder34_1;

if FinalSign is equal to 1, changing the sign of AdderAll_0;

setting t=AdderAll_0; and calculating an approximation of one of Sin Pi(t) and Cos Pi(t).

* * * * *